UNITED STATES PATENT OFFICE.

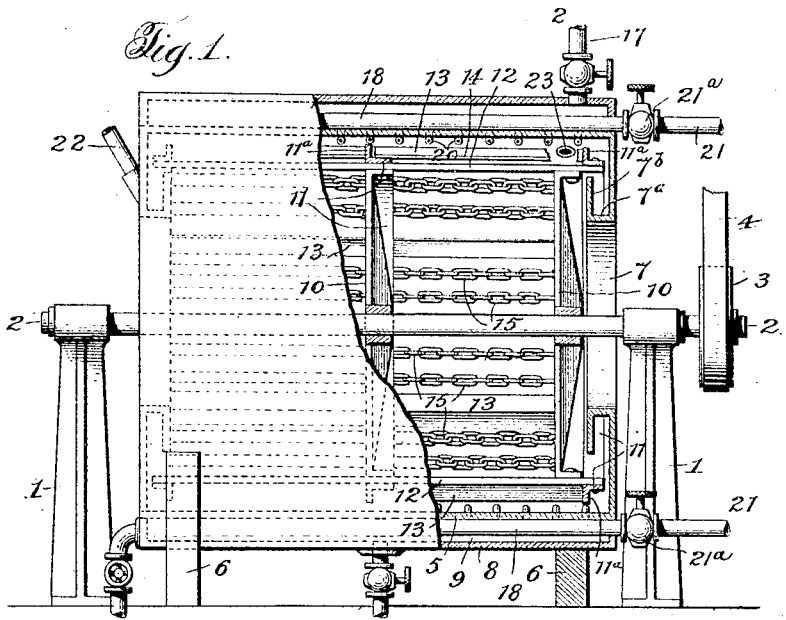
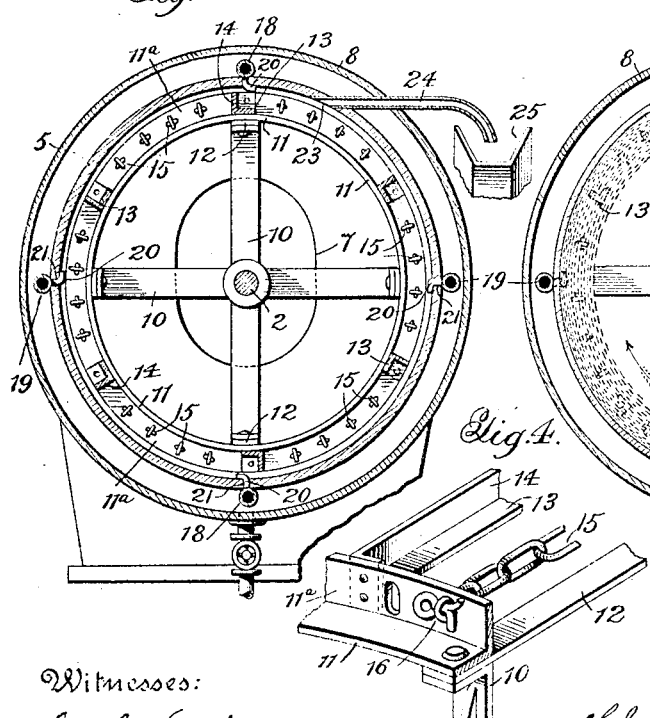
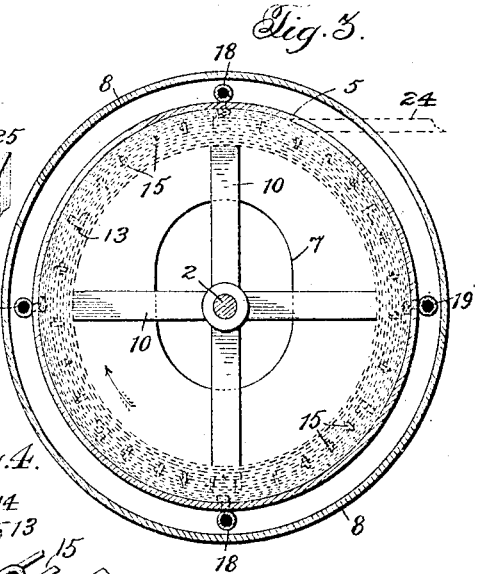

CHARLES R. MABEE, OF TOLEDO, OHIO.

ART OF TREATING LIQUID SUBSTANCES.

1,420,644.   Specification of Letters Patent.   Patented June 27, 1922.

Application filed October 24, 1913, Serial No. 797,087. Renewed July 12, 1916. Serial No. 108,956.

*To all whom it may concern:*

Be it known that I, CHARLES R. MABEE, a citizen of the United States, residing at Toledo, in the county of Lucas and State of Ohio, have invented certain new and useful Improvements in the Art of Treating Liquid Substances, of which the following is a specification, reference being had therein to the accompanying drawing.

This invention relates to the art of evaporation and pertains more particularly to a method wherein the substance to be treated or evaporated is maintained in active proximity to a treating surface under presssure towards and movable across or over the treating surface.

In treating substances for evaporating the water therefrom, either to reduce the material to a solid, powder, or dried state, or the entire mass to a concentrated or semi-liquid state, it has been customary heretofore to place the substance in bulk in a heated container, and to constantly stir the material during the treatment, with a view of causing the same to come into contact with the heated surface of the container from which the material, by the stirring action, continuously moves toward and from the surface. This is commonly known in the art as the "stirring method".

Treatment of milk has also been carried on by what is known as the "vacuum process" and there have also been suggested many other systems of evaporation such as the injection of heated air into the liquid. As far as I have been advised, however, all of the systems heretofore employed have been expensive and required a long period of treatment to effect the results desired.

My present method has to do with the treatment of substances for evaporation in a very rapid and pronouncedly economical manner. The method also comprises a continuous process, as distinguished from an intermittent procedure. In treating liquid substances or substances containing liquid for the purpose of drying or eliminating a part of the liquid substance, one of the methods heretofore employed has been to subject the liquid to the action of heat while in open evaporating pans. The open pan process is, relatively speaking, very slow and owing to the length of time required for treatment, the milk will often be rendered objectionable. These objections were thought to be overcome by placing the material in vacuum pans which is a very expensive and prolonged method. It has been ascertained, however, from the method presently to be described that by treating the material under pressure, employing conveniently centrifugal force, and in a manner to permit the gases and vapors to escape readily, and also while maintaining the material under constant movement or advancement over the heated surface, better, more economical and expeditious results are obtained than with either the vacuum or open pan methods.

The invention may be characterized definitely as one wherein a relatively shallow body of material in liquid form or containing liquid, is maintained and subjected while under gyratory motion in a circular path, to the action of centrifugal force, which carries and holds the same in contact with or in proximity to a surface having a temperature differing from that of the material to be treated, and at the same time retaining a free space into which the generated vapors or gases readily pass and escape, or are abstracted.

In carrying out the art or method, numerous forms of apparatus may be employed, but for the purpose of these specifications, an apparatus is shown and described by way of illustration only, the same having been ascertained to be useful and satisfactory, in this connection.

In the drawings:—

Figure 1 is an elevation of an apparatus of the character referred to, partly broken away, and partly in section, to better illustrate the interior construction.

Figure 2 is a transverse section.

Figure 3 is a similar section illustrating the apparatus in action;

Figure 4 is a detail perspective view, enlarged, of a portion of the breaker and conveyor means.

With more particular reference to the drawings, wherein like reference numerals refer to corresponding parts throughout the several views, 1—1 designate suitable standards adapted to support a rotatable shaft 2, which latter is driven at a high rate of speed, in any desired manner, as for instance by the connected pulley 3, actuated by a suitable belt 4. Arranged between the standards 1 is a suitable cylindrical drum 5, preferably stationary and positioned on suitable feet 6. The drum is preferably open at opposite ends, as illustrated at 7. These openings are preferably elliptical, the wall 7ª surrounding the openings having an inwardly projecting flange or collar 7^b forming a runway for the material. The particular slope of the runway assists in rapidly feeding the material to the base of the drum to be taken up by the conveyors and breakers, to be presently described. At the same time, the lower portion of the openings are positioned a sufficient distance above the base of the drum to prevent any splashing of the material out of the ends of the drum through said openings.

A sleeve or jacket 8 surrounds the drum and is suitably connected thereto so as to provide an intervening space 9. Supported on the shaft 2 is a suitable rotary breaker and conveyor mechanism. The said mechanism is preferably made up as follows:—

Spokes or webs 10 are secured at intervals on the shaft 2,—three sets being shown—. Projecting between the webs 10 are elongated longitudinally extending brace bars 12, upon which are mounted annular rings or rims 11. Arranged at suitable intervals about the periphery of the wheel formed by the parts just described are conveyor-members preferably comprising angle bars 13 secured to the rims 11 in any desired manner, the flanges 14 of which are adapted to, in the rotary movement of the device, pick up and carry the material to and around the inner surface of the drum. The conveyor members preferably extend from end to end of the breaker and conveyor mechanism.

Arranged to extend between flanges 11^a of the annular rim members 11, and at closely associated distances apart are suitable chains 15, such chains being connected in any desired manner, for instance, as illustrated at 16, and preferably substantially flush with the plane of the outer edge of the flanges 14 of the conveyor members proper.

The chains 15 or equivalent means co-operate with the members 14 to convey the liquid or substance and impart a rotary movement thereto, and the chains further serve to break up the material into fine particles, making it easier or more direct for the gases or vapors to pass through the liquid or substance which takes the form of a film or wheel on the inner periphery of the drum.

A suitable means for exteriorly heating the drum preferably takes the form of steam or the like entering the outer jacket at 17, the steam encircling the drum and filling the space formed between the drum and surrounding jacket. It is obvious, of course, that material other than steam may be introduced into the jacket according to the desired treatment.

The evaporating process may be accelerated somewhat by the introduction, at suitable intervals, into the drum, of air or steam, or both, according to conditions. This is preferably accomplished through the medium of piping, projecting through the jacket, there being two sets of air pipes 18, and two sets of steam pipes 19 illustrated, though any desired number of each may be employed. These pipes have suitable outlet nipples 20 leading through openings 21 in the periphery of the drum. The nipples 20 are preferably arranged with their outlets offset in the direction of rotation of the breaker and conveyor mechanism, to the end that the air or steam, or both, will be introduced by an entraining action due to the movement of the fluid or substance about the inner surface of the drum. The air or steam passes through the film of fluid or substance thereby assisting in abstracting the moisture therefrom. Other material or gases in lieu of or in addition to air or steam may be utilized, and any of the pipes may be closed at will by suitable valves 21^a. The nipples are conveniently welded to the wall surrounding the openings 21 so as to form a closed joint.

The milk or material to be treated is preferably introduced adjacent one end of the drum through the medium of a pipe or chute 22, having an outlet so as to discharge into the runway formed by the collar 7^b. The treated fluid or substance may be removed at any convenient point about the periphery of the drum, and as illustrated, an outlet port 23 may be provided in the drum connected with a tangentially arranged pipe or flue 24 adapted to discharge into a suitable trough or runway 25, or into other containers should it be desired to employ the multiple process. The outlet tube 24 is preferably arranged at the opposite end of the drum to the inlet 21 and the treated material will, of its own motion, find an outlet through said pipe.

In carrying out the method with the apparatus above described, substantially the following may be regarded as the procedure. We shall assume that the liquid being treated is milk. The milk is fed into the drum conveniently at one end; the conveyors having previously been set in motion are travelling at the rate approximately from 200 to 250 revolutions per minute (the speed may be altered according to conditions). The material is immediately caught up by the conveyors, and owing to the rapid movement thereof, is transferred to the heated sides of the drum and deposited thereon. The flow of material continuing, the deposit on the surface is continued until there is built up on the surface, through the centrifugal action, a stratum, layer, or film of material varying in thickness or depth up to from 2 to 5 inches according to the rapidity of the movement of the conveyors. The material is not allowed to settle, but as stated, accumulates and has a movement over the surface in a forward direction. It has been observed that the movement of the material in its circular course over the heated surface is somewhat likened to that of a wheel rim when in motion. It has been also ascertained that the speed of the moving body approximates four-fifths of the speed of the conveyors. By the relative lagging movement of the material and by the employment of the chains referred to, the material is subjected more or less to a breaking-up action, which greatly facilitates and accelerates the evaporating process, inasmuch as the molecules or particles are somewhat separated and the gases arising are more quickly liberated and permitted to enter the quiet zone within the moving ring of material. The material or liquid being carried up and deposited has a tendency to increase in thickness, as above intimated, largely through the attractive or carrying forces, so that the inner face of the ring-shaped body of liquid presents a perfectly smooth surface throughout, as distinguished from a broken-up or ruffled surface. The conveyors are arranged conveniently within about one-half of an inch of the drum surface and maintain the liquid properly therebeyond in position and in contact or adjacent the heating surface by the centrifugal force created, while the outer surface or portions of the liquid belt, as above indicated, is maintained in position by the centrifugal action, as I understand, and possibly also by the sucking action of the more rapidly moving conveyors and the natural entraining action of the material itself. The relatively fast movement of the conveyors maintains the orbital action of the moving material, so that the liquid is retained in closed and forcible contact with or in proximity to the heating surface. The heated gases and vapors generated at or adjacent the surface, being lighter than the liquid, will pass off therethrough, carrying with them moisture and finding exit through the quiet zone at the center of the drum. These vapors may be allowed to escape into the air more conveniently and may be collected or abstracted and conducted to other separators in a manner known as the multiplying system of treatment.

It has been found that in producing the product known as the confectioner's brand of milk, by this method, the sugar incorporated with the liquid which is a very material percentage thereof, will be absorbed and will not crystallize during treatment or after treatment, as it does in other known processes.

While it is believed that the action of the physical forces, as above suggested, is correct, it is to be understood, however, that having ascertained that the result is as described, the action of the physical force may be somewhat different from that suggested.

During the continued operation of the machine, the milk being fed in at one end is automatically and continuously discharged at the other end in a concentrated form or semi-liquid form. The milk at no time settles at the bottom and the abstraction can occur at any convenient point near the periphery of the drum. The method may, therefore, be characterized as a continuous method.

While excellent results have been obtained with a drum having imperforate walls, the operation may be accelerated somewhat by introducing at intervals, the air or steam through the openings in the walls and pipes above referred to. The air or steam is introduced into the drum and into the body of liquid or substance preferably by an entraining action, and it penetrates the walls of the liquid cylinder passing into the interior, the fluid in its passage abstracting moisture from the material and entering the quiet zone. Where it is desired to subject the volume of material to the action of steam alone for usual treatment of the milk constituents such as the casein, it is only necessary to close the air pipe valves or to eliminate these pipes. Other material or gases in lieu of or in addition to the air or steam may be employed.

While in describing the method, milk has been used as an illustration, with which the method may be employed, it is to be understood that other substances may be treated without departing from the invention.

An additional and highly important result of the present method is the elimination of the customary entrainment of a considerable proportion of the solids which under existing practices, where the substances are not subjected to pressure during evaporation, would be carried off with the gases and vapors emanating from the body of the substance. In the present method the rapid rotary movement and continuous centrifugal force to which the substance is constantly subjected would prevent any portion of the solids being entrained and lost with the discharged vapors and gases.

I desire to emphasize the fact that in the treatment of certain substance the introduction of air in a manner so that it will enter or pass through the substance being treated is important.

It has been ascertained in practice that in carrying out the method as described by the generation of the force within through the instrumentality of the conveyors or other means, that the "rim" or film of material being treated is agitated in a manner which creates throughout the moving body of material a disturbance of the particles, thus producing a film wherein the particles are continuously agitated. This action, as has been ascertained, expedites the treatment.

I have in other, copending, applications illustrated and described modified forms of evaporating or condensing apparatus, and modified methods of procedure in evaporating or condensing work.

In application No. 718,114, filed August 21, 1912, and application No. 277,904, (a division of No. 718,114), filed February 18, 1919, I illustrated and described a mechanism and the method followed in using the same, relating to the forming of a film or layer on the inner surface of the heating cylinder, together with a vacuum exhaust duct communicating with the cylinder.

In my application Serial No. 738,178, filed December 23, 1912, I have illustrated and described a method of forming a layer or stratum of vaporizable material on the inner surface of a heated tubular container, the container being provided with a copious discharge for the vapors, vacuum creating means, and means whereby the stratum, at its end, can be sharply defined, as by extending an abutment radially inward from the container wall.

In my copending application Serial No. 805,598, filed December 9, 1913, a division of the present application, I have described and claimed an apparatus useful in carrying out the method herein contemplated.

(After careful review of the record in this application and comparison thereof with that in applicant's copending application Serial No. 277,904, filed February 18, 1919, it is seen that to avoid confusion and to properly correlate these records, the claims that have been appearing herein as Nos. 13 and 22 should be transferred to said other application No. 277,904, applicant having this day filed an amendment asking the insertion of these claims in said application Serial No. 277,904. This amendment is being made after conference with the Examiner, and an understanding that this transfer can properly be made.)

In applications Nos. 40,757, filed July 19, 1915, and No. 77,996, filed February 12, 1916, I illustrated and described another modified mechanism and method.

And I do not herein claim any of the subjects matter presented by the claims in any of the said several co-pending applications.

I claim:—

1. The art of treating liquid material or material containing liquid which consists in subjecting a continuous relatively shallow body of material while under gyratory motion in a circular path to the action of centrifugal force while in contact with a surface having a temperature differing from that of the material being treated, and at the same time retaining within the center of the shallow body of moving material a free space into which the vapors or gases are allowed to escape from the material, and introducing evaporating fluid into the body of material.

2. The art of evaporation which consists in applying to the inner surface of an externally heated cylindrical container, a substantially uniform layer of substance, maintaining said layer in contact with the inner surface in the form of a ring, allowing heated gases to pass from the exterior of the container through the substance into the hollow interior of the ring of substance, and subjecting said ring of substance to a rotary movement relative to said surface.

3. The art of treating a substance having evaporable constituents consisting in introducing the substance into a treating container of circular cross section, positively causing the substance to assume the form of a layer on the treating surface, maintaining the layer formation throughout treatment, rapidly moving the layer circularly over the treating surface, and simultaneously causing the entire body to move from a point approximately the point of introduction, to the opposite end of the container, heating said surface to a temperature sufficient to vaporize liquid constituents of the substance, and permitting the material to continuously escape from the opposite end of the container, while permitting the vapors to independently escape from the container.

4. The improved method of treating substance consisting in applying by centrifugal force a layer of the substance to the interior surface of an exteriorly heated cylindrical container, maintaining the layer of material in continuous rotary movement over said surface, and introducing through the cylinder and inwardly into the layer an evaporating fluid.

5. The improved method of treating substance consisting in applying by centrifugal force a layer of the substance to the interior surface of an exteriorly heated cylindrical container, maintaining the layer of material in continuous rotary movement over said surface, exerting pressure to the outer surface of the layer, and introducing through the cylinder to the inner surface of the layer air and steam, the film maintaining a hollow central space into which the vapors pass from the layer.

6. The art of evaporation, which consists in applying to the inner surface of an externally heated cylindrical container open to maintain substantially atmospheric pressure therein an endless layer of substance, subjecting the same while in layer formation to continuous rapid circular movement over the surface while maintaining the same under simultaneously lengthwise movement continuously toward the outlet end of the container, maintaining a central quiet zone within the layer, and permitting the vapors to escape from said zone.

7. The art of evaporation consisting in projecting a rim of material onto a heated surface, moving the material over the surface and introducing a treating fluid inwardly into the material.

8. The art of evaporation consisting in centrifugally disposing a layer of liquid onto a heating surface, causing the layer to move with relation to the heated surface, and entraining air into the material during its movement.

9. The art of evaporation consisting of centrifugally disposing a layer of liquid onto a heating surface, causing the liquid to move over the heating surface, and causing air to enter the said material from its outer portions inwardly.

10. The art of evaporation consisting of centrifugally disposing a layer of liquid onto a heating surface, causing the liquid to move over the heating surface, and causing air to enter the said material during its treatment.

11. The art of evaporation consisting in spreading a layer of material over a cylindrical heated surface, causing the material to move over the surface, while maintaining the same in contact with the surface, and subjecting said material to a treating fluid.

12. The art of treating material to change its consistency consisting in maintaining a hollow cylindrical layer of material under force against and causing it to move in a circular path over a surface having a temperature different from that of the material being treated, and introducing air to the said material.

13. The method of treating a substance containing liquid to change its consistency, consisting in introducing a volume of the substance into a treating container of circular cross-section, causing the material to assume the form of a thin substantially uniform layer on the wall of the container, maintaining the layer formation throughout treatment, rapidly moving the substance circularly over the surface, causing the maintained layer to progress lengthwise of the container, heating the wall of the container to cause a rapid evaporation of the liquid, permitting the gases and vapors to escape inwardly from the layer and from the container, and allowing the treated material to escape from the container at a point remote from the point where the material is first applied to the surface.

14. The process of concentrating a substance containing liquid consisting in introducing the substance into a container of substantially circular cross section heated to a temperature sufficient to vaporize liquid constituents of the substance at substantially atmospheric pressure, shaping the substance in a unitary layer of continuous exterior conformation and with an interior substantially unobstructed vapor zone, rapidly moving the layer circularly over the surface and simultaneously causing the entire body of substance to move from the point of introduction toward the opposite end of the container, permitting the substance to escape after treatment, and permitting the vapor to escape inwardly from the layer and freely from the container.

15. The method of condensing liquids consisting in introducing the liquid into a cylindrical heated container, centrifugally shaping the liquid with an interior vapor zone, moving the liquid endwise of the container, and simultaneously subjecting the liquid to a breaking-up action without destroying the vapor zone.

16. The process of concentrating a substance containing liquid consisting in introducing the substance into a container of substantially circular cross section heated to a temperature sufficient to vaporize liquid constituents of the substance at substantially atmospheric pressure, shaping the substance in a layer upon the interior surface of the container, rapidly moving the layer circularly over the surface and simultaneously causing the entire body of substance to move from the point of introduction toward the opposite end of the container, permitting the substance to escape after treatment, and permitting the vapor to escape inwardly from the layer and freely from the container.

17. The process of concentrating a substance containing liquid consisting in introducing the substance into a container of substantially circular cross section heated to a temperature sufficient to vaporize liquid constituents of the substance at substantially atmospheric pressure, shaping the substance in a layer upon the interior surface of the container, rapidly moving the layer circularly over the surface and simultaneously causing the entire body of substance to move from the point of introduction toward the opposite end of the container, permitting the substance to escape after treatment, permitting the vapor to escape inwardly from the layer and freely from the container, and subjecting the substance of which the layer is composed to agitation.

18. The art of treating material containing liquid which consists in subjecting a continuous relatively shallow body of material while under gyratory motion in a circular path to the action of centrifugal force while in contact with a surface having a temperature different from that of the material being treated, and at the same time retaining within the center of the shallow body of moving material a free quiet space into which the vapors or gases are allowed to escape from the material, and introducing treating fluid into the body of material.

19. The process of condensing milk consisting in introducing the milk into a container of substantially circular cross section heated to a temperature sufficient to vaporize liquid constituents of the milk at substantially atmospheric pressure, shaping the milk in a unitary layer of substantially continuous exterior conformation and with an interior vapor zone, rapidly moving the layer circularly over the surface and simultaneously causing the entire body of milk to move from the inlet toward the outlet of the container, permitting the milk to escape after treatment, and permitting the vapor to escape inwardly from the layer and freely from the container.

20. The art of treating a substance having evaporable constituents consisting in introducing the substance into a treating container of circular cross section, positively causing the substance to assume the form of a layer on the treating surface, maintaining the layer formation throughout treatment, rapidly moving the layer circularly over the treating surface and simultaneously causing the entire body to move from a point approximately the point of introduction to the opposite end of the container, heating the treating surface to drive off evaporable constituents and permitting the driven off gases and vapor to escape inwardly from the layer and from the container.

21. The method of evaporating a liquid containing substance, which consists in uniformly heating a tubular container, supplying and causing the substance as supplied to form a thin substantially uniform cylindrical layer upon the interior face of said container while maintaining the particles so composing said substance in substantially the same order of flow, maintaining said layer under the pressure of centrifugal force, maintaining a vapor receiving space throughout the length of the substance lined heated container and permitting the escape of vapors therefrom, and withdrawing the evaporated substance from the opposite end of the said tubular container.

22. The improved method of treating substance consisting in the applying by centrifugal force a layer of the substance to the interior surface of an exteriorly heated cylindrical container, maintaining the layer of material in continuous rotary movement over said surface, and introducing a fluid different from that being treated into the layer.

23. The art of evaporating milk or similar substances containing liquid which consists in supplying the substance into one end of a container having a substantially continuous unbroken cylindrical treating surface, subjecting said treating surface to uniform temperature throughout sufficient to evaporate liquid constituents of the substance, subjecting the substance to the action of therewith contacting rapidly rotatable conveyors whereby the substance is caused to assume and maintain a continuous circular layer formation movable circularly and longitudinally in the same general direction in contact with the cylindrical treating surface, and whereby there is maintained a central vapor space within the layer of material from end to end of said treating surface, and withdrawing the evaporated substance from the opposite end of the treating surface.

24. The improved method of treating substance consisting in applying by centrifugal force a layer of the substance to the interior surface of an exteriorly heated cylindrical container, maintaining the layer of material in continuous rotary movement over said surface, and introducing a fluid different from that being treated through the cylinder into the layer, the film maintaining a hollow central space into which the vapors pass from the layer.

25. The art of evaporation consisting of centrifugally disposing a layer of liquid onto a heating surface, causing the liquid to move over the heating surface, and causing a fluid to enter the outer surface of the said material.

26. The process of changing the consistency of material which consists in subjecting a cylindrical layer of material to continuous uninterrupted movement relative to and while in contact with a treating surface having a temperature different from that of the material, and introducing fluid different from that of the material treated into the body of the material during said relative movement.

27. The method of concentrating a substance containing liquid consisting in introducing the substance into one end of a container of substantially circular cross-section heated to a temperature sufficient to vaporize liquid constituents of the substance, shaping the substance in a layer upon the interior surface of the container, rapidly moving the layer circularly over the surface and simultaneously causing the entire body of the substance to move from the point of introduction toward the opposite end of the container, permitting the substance to escape after treatment, and permitting the vapor to escape inwardly from the layer and to pass from the container.

In testimony whereof I affix my signature in presence of two witnesses.

CHARLES R. MABEE.

Witnesses:
G. A. MARVIN,
C. A. KREY.